United States Patent
Yonaha

(10) Patent No.: US 8,634,676 B2
(45) Date of Patent: Jan. 21, 2014

(54) OBJECT ESTIMATION DEVICE, METHOD AND PROGRAM

(75) Inventor: Makoto Yonaha, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 13/175,478

(22) Filed: Jul. 1, 2011

(65) Prior Publication Data

US 2012/0057759 A1  Mar. 8, 2012

(30) Foreign Application Priority Data

Jul. 2, 2010 (JP) ................... 151865/2010

(51) Int. Cl.
*G06K 9/64* (2006.01)

(52) U.S. Cl.
USPC .......................................... 382/279

(58) Field of Classification Search
USPC ............... 345/611; 382/264, 279; 708/5, 315, 708/420, 813
See application file for complete search history.

(56) References Cited

U.S. PATENT DOCUMENTS

| | | | | |
|---|---|---|---|---|
| 2003/0118246 A1* | 6/2003 | August | .................. | 382/260 |
| 2008/0247651 A1* | 10/2008 | Takaki et al. | .................. | 382/219 |
| 2009/0324087 A1* | 12/2009 | Kletter | .................. | 382/195 |

FOREIGN PATENT DOCUMENTS

| | | | | |
|---|---|---|---|---|
| JP | 2003248824 A | * | 9/2003 | ............... G06T 7/00 |
| WO | 2009/130451 A1 | | 10/2009 | |

OTHER PUBLICATIONS

Fujiyoshi, "Gradient-Based Feature Extraction -SIFT and HOG-", Study Report of the Information Processing Society of Japan, the Information Processing Society of Japan, vol. 2007, No. 87, pp. 211-224 (2007).

Fukushima et al., "A Study of Multi-scaled Edge Integration", Technololgy Report of the Institute of Television Engineers of Japan, the Institute of Television Engineers of Japan, vol. 17, No. 38, pp. 31-36 (1993).

Office Action of JP 2010-151865 dated Nov. 19, 2013.

* cited by examiner

*Primary Examiner* — Gregory F Cunningham
(74) *Attorney, Agent, or Firm* — Birch, Stewart, Kolasch & Birch, LLP

(57) ABSTRACT

Efficient and accurate estimation of the position and size of an object is achieved. Convolution of an image with a smoothing filter is repeated to generate a plurality of smoothed images $L(x, y, \sigma_i)$ of different scales. Then, a differential image $G(x, y, \sigma_i)$ between each pair of the smoothed images $L(x, y, \sigma_i)$ of scales $\sigma_i$ and $\sigma_{i \times 2}$ is generated. Then, a combined image AP is generated by combining the differential images $G(x, y, \sigma_i)$, and a position estimating unit estimates the position of the object based on the combined image AP.

13 Claims, 8 Drawing Sheets

FIG.4

| 8/72 | 10/72 | 8/72 |
|---|---|---|
| 10/72 | 10/72 | 10/72 |
| 8/72 | 0 | 8/72 |

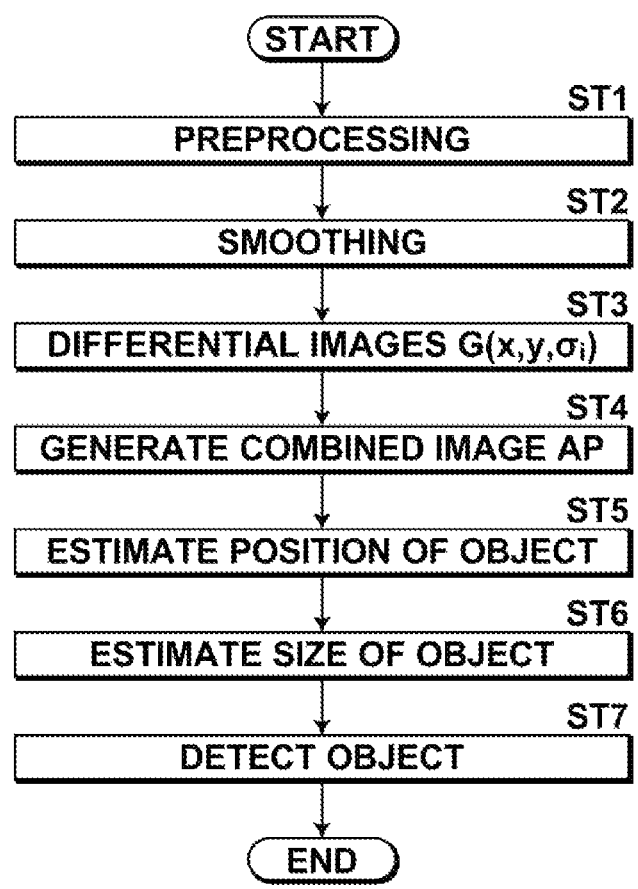

OBJECT ESTIMATION DEVICE, METHOD AND PROGRAM

BACKGROUND OF THE INVENTION

1. Field of the Invention

The present invention relates to an object estimation device, an object estimation method and an object estimation program for estimating position and size of an object in an image.

2. Description of the Related Art

As a method for detecting a specific object, such as a face or a person in an image, detection methods using an image pyramid have been proposed (see, for example, U.S. Patent Application Publication Nos. 2009324087 and 2008247651, which are hereinafter referred to as Patent Documents 1 and 2). In the techniques disclosed in Patent Documents 1 and 2, a plurality of smoothed images of different scales are generated by repeating convolution of an image with a Gaussian filter. Then, a differential image between each pair of the smoothed images of adjacent scales is generated (which is also referred to as a DOG (difference of Gaussian) image). The generation of the DOG images is carried out for each of multi-resolution images of different resolutions. Then, the maximum value and the minimum value in each DOG image are detected to detect the position of an object and to detect the size of the object in the multi-resolution images.

Further, a method for estimating an object area with using a Gaussian filter tailored to characteristics of the object has been proposed (see, for example, Japanese Unexamined Patent Publication No. 2003-248824, which is hereinafter referred to as Patent Document 3). Patent Document 3 discloses carrying out filtering with using a Gaussian filter, which has filtering characteristics tailored to the contour of an object to be detected, and then, highlighting an area having the contour of interest and diminishing the other areas, thereby detecting the object.

However, the techniques disclosed in Patent Documents 1 and 2 require generation of the differential image between each pair of smoothed images of adjacent scales, and it is necessary to generate a large number of differential images for a large number of resolution images. Therefore, speeding up of the operation is difficult to be achieved. Further, in the case where only the Gaussian filter based on the contour is applied, as disclosed in Patent Document 3, it is impossible to achieve accurate object detection.

SUMMARY OF THE INVENTION

In view of the above-described circumstances, the present invention is directed to providing an object estimation device, an object estimation method and an object estimation program which provide high-speed and accurate object estimation.

An aspect of the object estimation device of the invention is an object estimation device including: smoothing means for generating a plurality of smoothed images of different scales by repeating convolution of an image with a smoothing filter having filtering characteristics corresponding to a contour of an object; differential image generating means for generating a plurality of differential images by calculating a difference between each pair of the smoothed images apart from each other by a predetermined scale interval in the smoothed images generated by the smoothing means; combining means for generating a combined image by combining the differential images generated by the differential image generating means; and position estimating means for estimating a position of the object from a position where a maximum or minimum signal value is found in the combined image generated by the combining means.

An aspect of the object estimation method of the invention is an object estimation method including the steps of: generating a plurality of smoothed images of different scales by repeating convolution of an image with a smoothing filter having filtering characteristics corresponding to a contour of an object; generating a plurality of differential images by calculating a difference between each pair of the smoothed images apart from each other by a predetermined scale interval in the generated smoothed images; generating a combined image by combining the generated differential images; and estimating a position of the object from a position where a maximum or minimum signal value is found in the generated combined image.

An aspect of the object estimation program of the invention is a program for causing a computer to execute a procedure comprising: generating a plurality of smoothed images of different scales by repeating convolution of an image with a smoothing filter having filtering characteristics corresponding to a contour of an object; generating a plurality of differential images by calculating a difference between each pair of the smoothed images apart from each other by a predetermined scale interval in the generated smoothed images; generating a combined image by combining the generated differential images; and estimating a position of the object from a position where a maximum or minimum signal value is found in the generated combined image.

Repeating convolution of the image with the smoothing filter herein refers to repeating further convolution of the smoothed image with the smoothing filter.

It should be noted that the smoothing filter may be a Gaussian filter, for example, and, in particular, a smoothing filter having filtering characteristics tailored to the contour of the object.

The smoothing means may generate a×k pieces of smoothed images $L(x, y, \sigma_i)$, wherein a is an integer of 2 or more, $\sigma_i$ is a scale of the smoothing filter and i=1 to a×k. In this case, the differential image generating means generates the plurality of differential images by calculating a difference between each pair of the smoothed images apart from each other by a predetermined scale interval, and may generate, for example, k pieces of differential images $G(x, y, \sigma_i)$, wherein k is an integer of 2 or more, using the a×k pieces of smoothed images $L(x, y, \sigma_i)$ according to equation (1) below:

$$G(x,y,\sigma_i) = (x,y,\sigma_i) - L(x,y,\sigma_{i\times a}) \qquad (1).$$

Alternatively, the smoothing means may generate k pieces of smoothed images $L(x, y, \sigma_1)$, wherein k is an integer of 2 or more, $\sigma_i$ is a scale of the smoothing filter and i=1 to k, and the differential image generating means may generate k-p pieces of differential images $G(x, y, \sigma_x)$, wherein p is an integer of 1 or more, using the k pieces of smoothed images $L(x, y, \sigma_i)$ according to equation (2) below:

$$G(x,y,\sigma_i) = L(x,y,\sigma_i) - L(x,y,\sigma_{i+p}) \qquad (2).$$

In this case, the size estimating means may estimate the size of the object based on an extent of widening of blur in the smoothed images $L(x, y, \sigma_i)$ used to generate the differential image $G(x, y, \sigma_i)$ with the largest differential value or the smallest differential value.

The object estimation device may further include preprocessing means for generating a resolution-reduced image from an inputted original image. Further, the image may be a moving image, and the object estimation device may further include preprocessing means for extracting a motion area containing motion from a frame image based on the moving image, carrying out background differentiation, and applying contrast reduction.

The combining means generates the combined image by combining the differential images. At this time, the combining means may generate the combined image with using all the differential images, or using some of the differential images selected depending on the variation range of the size of object.

The position estimating means and the size estimating means may determine which of the maximum (largest) value or the minimum (smallest) value should be used to estimate the position and size, depending on the object to be detected. In the case where the object has a larger signal value than that of the background (for example, where the object is white and the background area is black), the maximum (largest) value may be used. In contrast, in the case where the object has a smaller signal value than that of the background (for example, where the object is black and the background area is white), the minimum (smallest) value may be used.

The object estimation device may further include object detecting means for detecting the object in the image based on the position of the object estimated by the position estimating means or the size of the object estimated by the size estimating means.

According to the object estimation device, the object estimation method and the object estimation program of the invention, a plurality of smoothed images of different scales are generated by repeating convolution of an image with a smoothing filter having filtering characteristics corresponding to a contour of an object, a plurality of differential images are generated by calculating a difference between each pair of the smoothed images apart from each other by a predetermined scale interval in the generated smoothed images, a combined image is generated by combining the generated differential images, and a position of the object is estimated from a position where a maximum or minimum signal value is found in the generated combined image. In this manner, high-speed and accurate estimation of the position of an object can be achieved.

In the case where the size estimating means for estimating the size of the object from the differential image with the largest differential value or the smallest differential value among the differential images generated by the differential image generating means is provided, estimation of the size of the object can be achieved without generating multi-resolution images as in the conventional techniques, thereby allowing efficient estimation of the size of the object.

In the case where the smoothing means generates the a×k pieces of smoothed images $L(x, y, \sigma_i)$ (where $\sigma_i$ is a scale of the smoothing filter and i=1 to a×k), and the differential image generating means generates the k pieces of differential images $G(x, y, \sigma_i)$ (k is an integer of 2 or more) according to equation (1) above with using the a×k pieces of smoothed images $L(x, y, \sigma_i)$, accurate estimation of the position and size of the object can be achieved.

In the case where the preprocessing means for generating a resolution-reduced image from the inputted original image is provided, faster detection can be achieved with the resolution of the image reduced to some extent without impairing the accuracy of detection.

In the case where the object detecting means for detecting the object in the image based on the position of the object estimated by the position estimating means is provided, more accurate and efficient detection of the object can be achieved with focusing the detection of the object in an area around the position estimated by the position estimating means.

BRIEF DESCRIPTION OF THE DRAWINGS

FIG. 4 is a diagram illustrating one example of a smoothing filter (Gaussian filter) used by the smoothing means shown in FIG. 1, FIG. 9 is a flow chart illustrating a preferred embodiment of an object estimation method of the invention.

DESCRIPTION OF THE PREFERRED EMBODIMENTS

Figure 1:
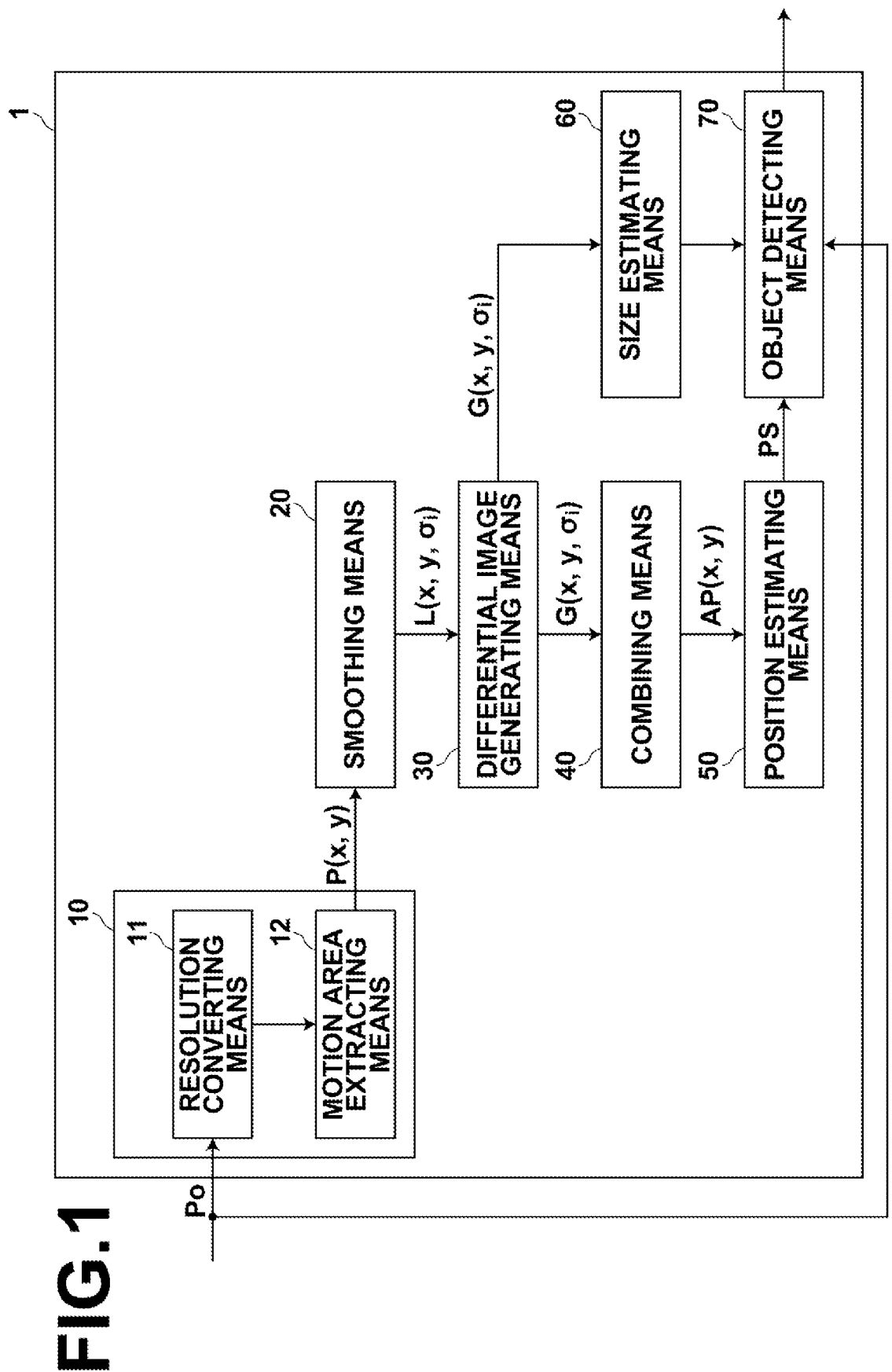
FIG. 1 is a block diagram illustrating a preferred embodiment of an object estimation device of the present invention.

Hereinafter, embodiments of the present invention will be described in detail with reference to the drawings. FIG. 1 is a block diagram illustrating a preferred embodiment of an object estimation device of the invention. It should be noted that the configuration of an object estimation device 1, as shown in FIG. 1, is implemented by running an object estimation program, which is read in an auxiliary storage device of a computer (such as a personal computer), on the computer. The object estimation program may be stored in an information storage medium, such as a CD-ROM, or distributed over a network, such as the Internet, to be installed on the computer.

The object estimation device 1 shown in FIG. 1 detects, for example, a person's head in a moving image as the object. The object estimation device 1 includes a preprocessing means 10, a smoothing means 20, a differential image generating means 30, a combining means 40, a position estimating means 50, a size estimating means 60, and a object detecting means 70.

The preprocessing means 10 applies preprocessing to an inputted moving image. The preprocessing means 10 includes a resolution converting means 11 and a motion area extracting means 12. The resolution converting means 11 reduces the resolution of the moving image to provide a reduced image of, for example, ⅛×⅛ of the number of pixels of the inputted image. Reducing the resolution of the original image to a necessary and sufficient resolution for the object estimation allows speeding up of the operation.

Figure 2:
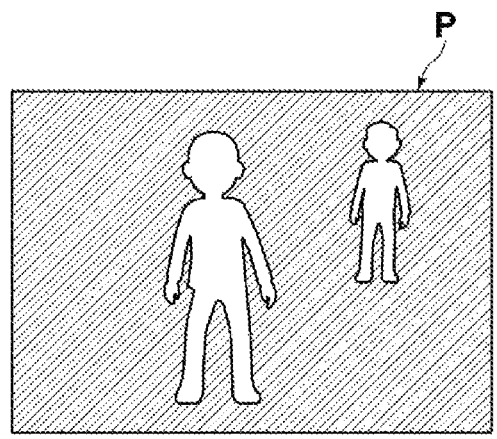
FIG. 2 is a schematic diagram illustrating one example of an image preprocessed by a preprocessing means shown in FIG. 1.

The motion area extracting means 12 extracts a motion area from a predetermined frame image forming the moving image. A known technique, such as a method involving calculating differential values between background images or differential values of an inter-frame image may be used to extract the motion area. Further, the motion area extracting means 12 has a function to perform gray-scale transformation or binarization, such as to convert the color of the motion area into white and the color of the background area into black, as shown in FIG. 2.

Figure 3:
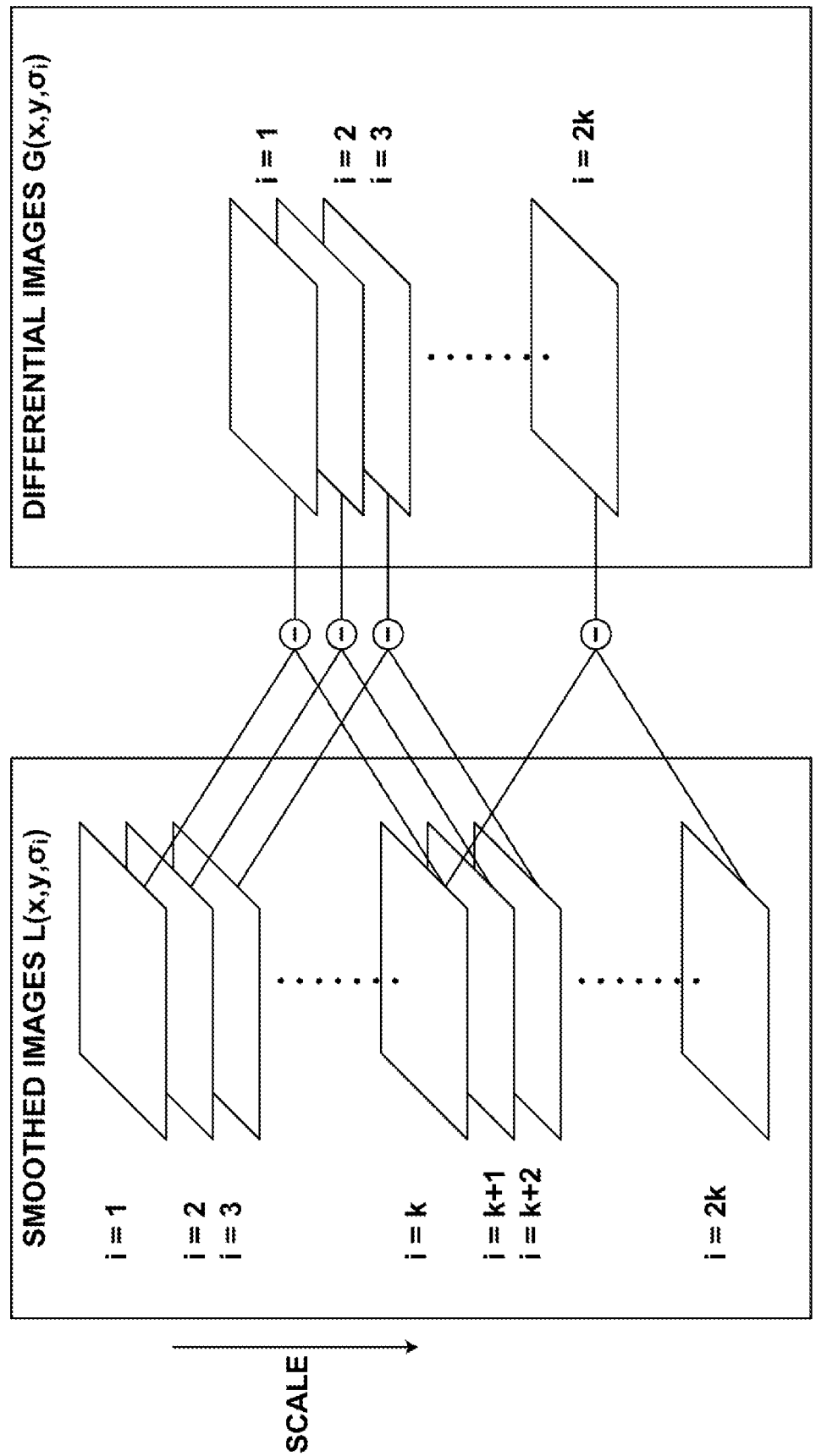
FIG. 3 is a schematic diagram illustrating one example of an image pyramid of smoothed images and differential images generated by a smoothing means and a differential image generating means shown in FIG. 1.

The smoothing means 20 shown in FIG. 1 generates a plurality of smoothed images $L(x, y, \sigma_i)$ of different scales $\sigma_i$ by repeating convolution of an image $P(x, y)$, which has been preprocessed by the preprocessing means 10, with a smoothing filter. Namely, the smoothing means 20 convolutes the image $P(x, y)$ with the smoothing filter to generate a smoothed image $L(x, y, \sigma_i)$, and further convolutes the smoothed image $L(x, y, \sigma_i)$ with the smoothing filter to generate another smoothed image $L(x, y, \sigma i+1)$ of a scale $\sigma_{i+1}$. The smoothing means 20 repeats this operation to generate $a \times k$ pieces of smoothed images $L(x, y, \sigma_i)$ (where $a=2$ and $a \times k=60$, for example) of different scales $\sigma i$ (where $i=1$ to $a \times k$), as shown in FIG. 3.

Figure 4:
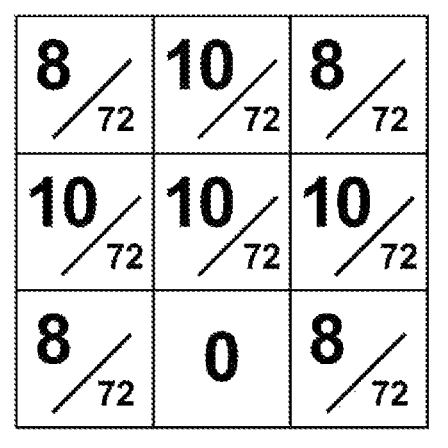
Figure 5:
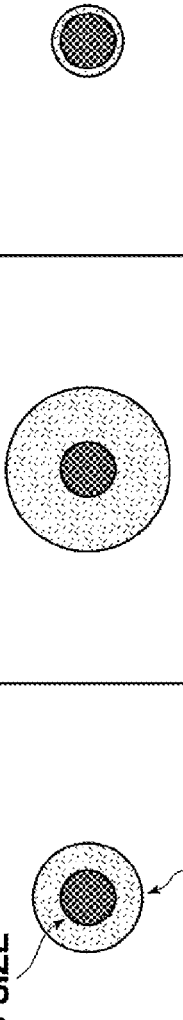
FIG. 5 is a schematic diagram illustrating another example of the smoothing filter (Gaussian filter) used by the smoothing means shown in FIG. 1.

The smoothing filter may, for example, be a Gaussian filter. In particular, the smoothing filter is formed by a 3×3 operator having filtering characteristics tailored to the shape of an object to be detected (person's head in this embodiment), as shown in FIG. 4, and has such characteristics that filter coefficients at the lower part are smaller to conform with the shape of a person's head (an "Ω" shape). Using this type of smoothing filter, smoothing is carried out such that an area having the contour of a person's head is highlighted and the other areas are diminished. It should be noted that the shape of the filter is not limited to that shown in FIG. 4, and any other known technique, such as one disclosed in Japanese Unexamined Patent Publication No. 2003-248824, may be used. For example, as shown in FIG. 5, in the case where the shape of the object is circular, triangular or rectangular, the smoothing is performed with using a smoothing filter having filtering characteristics tailored to the shape of the object.

The differential image generating means 30 shown in FIG. 1 generates a plurality of differential images $G(x, y, \sigma_i)$ for the smoothed images $L(x, y, \sigma_i)$ generated by the smoothing means 20. Each differential image $G(x, y, \sigma_i)$ represents a difference between each pair of the smoothed images $L(x, y, \sigma_i)$ of scales $\sigma i$, which are apart from each other by a predetermined value. Specifically, the differential image generating means 30 generates k pieces of differential images $G(x, y, \sigma_i)$ according to equation (1) below:

$$G(x,y,\sigma_i)=L(x,y,\sigma_i)-L(x,y,\sigma_{i \times a}) \quad (1).$$

It should be noted that the differential image $G(x, y, \sigma_i)$ may represent absolute values of the differential values resulting from equation (1).

Figure 6:
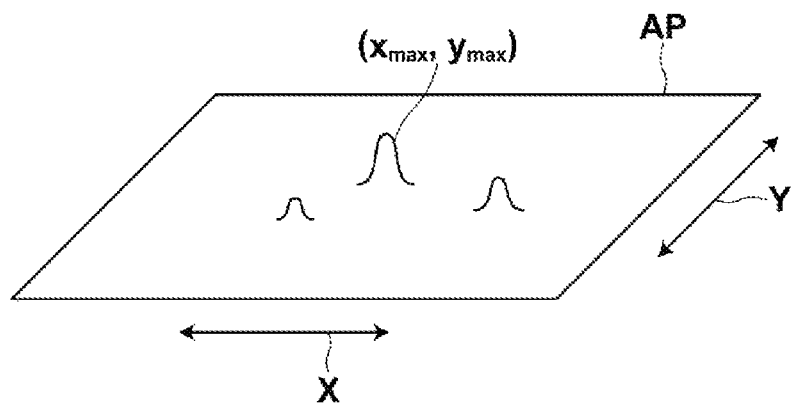
FIG. 6 is a schematic diagram illustrating one example of a combined image generated by a combining means shown in FIG. 1.

As can be seen from equation (1), each differential image $G(x, y, \sigma_i)$ is formed by differences between the smoothed images L of predetermined scales $\sigma_i$ and $\sigma_{i \times a}$. For example, in the case where $a=2$ and $a \times k=60$, 30 differential images $G(x, y, \sigma_i)$ including those generated from a pair of the smoothed images L of scales $\sigma_i$ and $\sigma_2$, a pair of the smoothed images L of scales $\sigma_2$ and $\sigma_4$, a pair of the smoothed images L of scales $\sigma_3$ and $\sigma_6$, . . . , and a pair of the smoothed images L of scales $\sigma_{30}$ and $\sigma_{60}$ are generated. Then, the combining means 40 combines the differential images $G(x, y, \sigma_i)$ generated by the differential image generating means 30 to generate a combined image $AP(x, y)$, as shown in FIG. 6. Although $a=2$ in this example, the value of "a" may be 2 or more, such as $a=3$.

It should be noted that, although each differential image $G(x, y, \sigma_i)$ is generated from a pair of the smoothed images $L(x, y, \sigma_i)$ of scales $\sigma_i$ and $\sigma_{i \times a}$ in this example, each differential image $G(x, y, \sigma_i)$ may be generated from a pair of the smoothed images $L(x, y, \sigma_i)$ of scales $\sigma_i$ and $\sigma_{i+p}$ (where p is an integer of 1 or more), as represented by equation (2) below:

$$G(x,y,\sigma_i)=L(x,y,\sigma_i)-L(x,y,\sigma_{i+p}) \quad (2).$$

The position estimating means 50 shown in FIG. 1 estimates the position of the object from a position (xmax, ymax) with the maximum signal value in the combined image $AP(x, y)$ generated by the combining means 40. The size estimating means 60 estimate the size of the object from the differential image $G(x, y, \sigma_i)$ with the largest differential value (i.e., the largest differential value of the differential image as a whole) among the differential images $G(x, y, \sigma_i)$. In other words, the differential image generating means 30 quantifies the saliency of the object according to equation (1) or (2), and the position estimating means 50 and the size estimating means 60 estimate the position and size of the object based on the quantified saliency.

Figure 7:
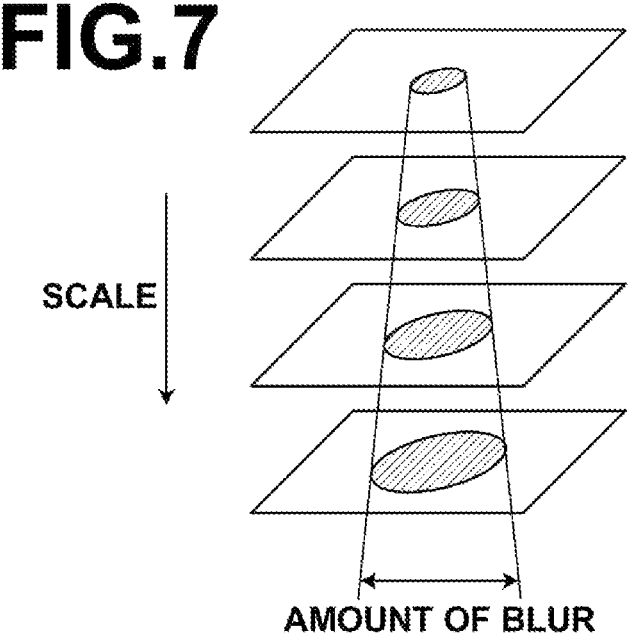
FIG. 7 is a schematic diagram illustrating how an object area is blurred and widened when a scale shown in FIG. 3 is increased.

First, since the above-described smoothing is performed with using the smoothing filter of having filtering characteristics tailored to the shape of the object, an area having the specified shape is highlighted and the other areas are diminished in the resulting smoothed images $L(x, y, \sigma_i)$. Although contour components of the object remain in the smoothed images even after some dozen times of smoothing, the area of the object is blurred and widened as the scale i is increased, as shown in FIG. 7.

Here, assumption is made that the shape and size of the object in the image are the shape and size of the object in a given smoothed image $L(x, y, \sigma_i)$. Further, in order to calculate the saliency of the shape and size of the object in this smoothed image $L(x, y, \sigma_i)$, another smoothed image $L(x, y, \sigma_{i \times a})$ of a scale that is apart from the scale of the smoothed image $L(x, y, \sigma_i)$ by a predetermined scale interval is set as a background (see FIG. 5). Then, the differential image $G(x, y, \sigma_i)$ between these smoothed images is calculated according to equation (1) or (2) above as the saliency of the object in the smoothed image $L(x, y, \sigma_i)$ of the predetermined scale i.

In this operation, if the differential image $G(x, y, \sigma_i)$ contains the object having an ideal shape (a shape that matches the best with the filtering characteristics) and no noise in the background, it has the largest signal value when compared to the other differential images $G(x, y, \sigma_i)$. That is, when pixel components forming the object in the preprocessed image $P(x, y)$ have been widened to fill an area that is almost equal to the area of the object, the differential value of the differential image $G(x, y, \sigma_i)$ is maximized. For example, if the object in the image $P(x, y)$ has a circular shape with a 10-pixel diameter, as shown in FIG. 5, a differential image $G(x, y, \sigma_{10})$ where $i=10$ (i.e. $G(x, y, \sigma_{10})=L(x, y, \sigma_{10})-L(x, y, \sigma_{20})$) has the largest differential value when compared to the other differential images $G(x, y, \sigma_i)$.

Figure 8:
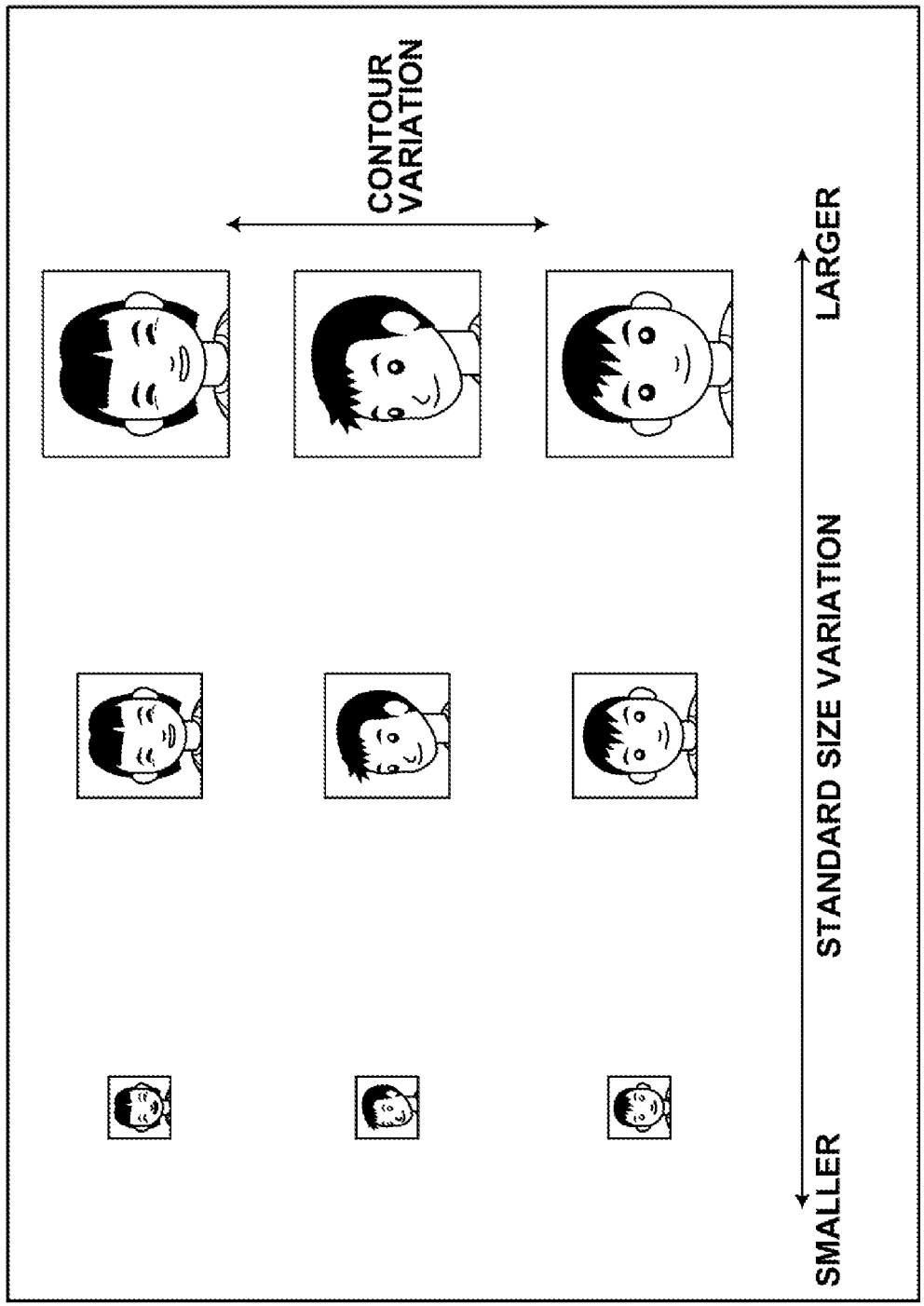
FIG. 8 is a schematic diagram illustrating how objects to be detected in a image vary.

On the other hand, appearance of the object actually captured in the image P varies depending on the positional relationship between the camera and the object, individual variability, etc., and the contour and size of the object are not always those of the ideal shape described above, as shown in FIG. 8. Therefore, the position estimating means 50 estimates the position of the object with using the combined image $AP(x, y)$, which is generated by combining the differential images $G(x, y, \sigma_i)$, as described above. This allows carrying out the estimation of the position of the object with absorbing variation of the object. That is, objects of various sizes, from small objects (head) to large objects (head), include contour variation (which is generated due to the positional relationship between the camera and the object, individual variability, etc., as mentioned above). With respect to such objects with contour variation, the estimation of the position of the object can be achieved with absorbing the variation by detecting the maximum value from the combined image $AP(x, y)$ calculated by addition.

It should be noted that, although the combining means 60 adds up all the differential images G(x, y, $\sigma_i$) in this example, the differential images G(x, y, $\sigma_i$) used in the addition may be changed depending on the size variation range desired to be absorbed. For example, the size variation range desired to be absorbed may be set depending on the type of the object, and the combined image AP(x, y) for detecting a certain object may be generated with using only the differential images G(x, y, $\sigma_i$) where i=3 to k in the addition and without using the differential images G(x, y, $\sigma_i$) where i=1 and i=2. Similarly, the differential images G(x, y, $\sigma_i$) where i=1 to k−q−1 (q is an integer of 1 or more) may be used in the addition without using the differential images G(x, y, $\sigma_i$) where i=k−q to k.

Further, the scale i in the above-described equations (1) and (2) is a parameter corresponding to the size of the object to be detected in the image P. If the size of the object is small, the largest value is detected from the differential image G(x, y, $\sigma_i$) with a small scale i. If the size of the object is large, the largest value is detected from the differential image G(x, y, $\sigma_i$) with a large scale i. Using this nature, the size estimating means 60 detects the differential image G(x, y, $\sigma_i$) with the largest differential value from the differential images G(x, y, $\sigma_i$), and estimates the size of the object from the scale, i.e., the number of repetition of the smoothing, of the detected differential image G(x, y, $\sigma_i$).

It should be noted that the size estimating means 60 may detect the differential image G(x, y, $\sigma_i$) with the largest differential value from the differential images G(x, y, $\sigma_i$), or may detect the largest differential value at the position of the object estimated by the position estimating means 50. Further, since the extent of widening (blurring) of the object image in the image P through the smoothing is known in advance, estimation of the size of the object can be achieved when the scale i is found out. Still further, since the appearance of the object to be detected varies, as described above, the estimated size (which is estimated from the differential image G(x, y, $\sigma_i$) with the largest differential value) ±α (α is a preset value) may be outputted as the estimated size of the object.

Further, since the motion area extracting means 12 carries out the gray-scale transformation or binarization to convert the color of the motion area (object) into white and the color of the background area into black (see FIG. 2) in this embodiment, the position estimating means 50 and the size estimating means 60 carry out the position estimation and the size estimation with using the maximum (largest) value. However, in the case where the motion area extracting means 12 converts the color of the motion area into black and the color of the background area into white, the position estimating means 50 and the size estimating means 60 carry out the position estimation and the size estimation with using the minimum (smallest) value. Even in this case, the position estimation and the size estimation can be achieved similarly to the case where the maximum (largest) value is used.

The object estimation device 1 shown in FIG. 1 further includes the object detecting means 70, which detects the object based on the position and size of the object estimated by the position estimating means 50 and the size estimating means 60. That is, the object detecting means 70 detects the object from an area around the position identified by the position estimating means 50 with using the result of estimation by the position estimating means 50 as a candidate area which is highly probable to contain the object. At this time, the object detecting means 70 detects the object based on the size of the object estimated by the size estimating means 60. It should be noted that the detection of the object by the object detecting means 70 can be achieved using a known technique which uses pattern matching, neural network, or the like.

As described above, estimation of the position and size of the object can be achieved only by calculating the differential image for each pair of the images of scales $\sigma_i$ and $\sigma_{1\times 2}$, which are apart from each other by a predetermined scale interval $\sigma_{1\times 2}$ (or $\sigma_{i\times a}$ or $\sigma_{i+p}$). Therefore, efficient and accurate object estimation can be achieved with a smaller number of the differential images to be generated than those required in the conventional object detection techniques using the DOG images.

FIG. 9 is a flow chart illustrating a preferred embodiment of an object estimation method of the invention. Now, the object estimation method is described with reference to FIGS. 1 to 9. First, when the moving image is inputted, downsampling is carried out at the preprocessing means 10. Further, at the preprocessing means 10, the motion area and the background area are extracted, and the gray-scale transformation, or the like, is carried out (step ST1, see FIG. 2).

Then, the smoothing means 20 generates the smoothed images (step ST2, see FIG. 3), and the differential image generating means 30 generates the differential image G(x, y, $\sigma_i$) between each pair of the smoothed images based on equation (1) described above (step ST3, see FIGS. 3 to 5). Subsequently, the combining means 40 generates the combined image AP by combining the differential images G(x, y, $\sigma_i$) (step ST4, see FIG. 6), and the position estimating means 50 estimates the position of the object based on the combined image AP (step ST5). Further, the size estimating means 60 estimates the size of the object with using the differential images G(x, y, $\sigma_i$) (step ST6). Then, the object detecting means 70 detects the object based on the estimated position and size (step ST7).

According to the above-described embodiment, the smoothed images L(x, y, $\sigma_i$) are generated by repeating convolution of the image P(x, y) with the smoothing filter having the filtering characteristics corresponding to the contour of the object, the differential images are generated by calculating a difference between each pair of the smoothed images L(x, y, $\sigma_i$) of scales apart from each other by a predetermined scale interval, the combined image AP(x, y) is generated by combining the differential images G(x, y, $\sigma_i$), and the position of the object is estimated from the position (xmax, ymax) where the maximum or minimum signal value is found in the combined image AP(x, y). In this manner, high-speed and accurate estimation of the position of the object can be achieved.

Further, in the case where the size estimating means 60, which estimates the size of the object from the differential image G(x, y, $\sigma_i$) with the largest differential value among the differential images G(x, y, $\sigma_i$) generated by the differential image generating means 30, is provided, estimation of the size of the object can be achieved without generating the multi-resolution images as in the conventional techniques, thereby allowing efficient estimation of the size of the object.

In the case where the smoothing means 20 generates the a×k pieces of smoothed images L(x, y, $\sigma_i$) (where $\sigma_i$ is a scale of the smoothing filter and i=1 to a×k), and the differential image generating means 30 generates the k pieces of differential images G(x, y, $\sigma_i$) (k is an integer of 2 or more) according to equation (1) described above with using the a×k pieces of smoothed images L(x, y, $\sigma_i$), as shown in FIG. 3, accurate estimation of the position and size of the object tailored to variation of the size of the object can be achieved.

In the case where the preprocessing means 10, which generates the resolution-reduced image from the inputted original image, is provided, faster detection can be achieved with the resolution of the image reduced to some extent without impairing the accuracy of detection.

In the case where the object detecting means 70, which detects the object in the image based on the position of the object estimated by the position estimating means 50, is provided, more accurate and efficient object detection can be achieved with focusing the detection of the object in an area around the position estimated by the position estimating means 50.

Embodiments of the present invention are not limited to the above-described embodiments. For example, although the specified object is detected from a moving image in the above-described embodiment, the object may be detected from a still image. Further, although the object is a person's head in the above-described embodiments, this is not intended to limit the invention, and the object may be face, car, etc., for example.

What is claimed is:

1. An object estimation device comprising:
    smoothing means for generating a plurality of smoothed images of different scales by repeating convolution of an image with a smoothing filter having filtering characteristics corresponding to a contour of an object;
    differential image generating means for generating a plurality of differential images by calculating a difference between each pair of the smoothed images apart from each other by a predetermined scale interval in the smoothed images generated by the smoothing means;
    combining means for generating a combined image by combining the differential images generated by the differential image generating means; and
    position estimating means for estimating a position of the object from a position where a maximum or minimum signal value is found in the combined image generated by the combining means.

2. The object estimation device as claimed in claim 1, further comprising a size estimating means for estimating a size of the object from the differential image having a largest differential value among the differential images generated by the differential image generating means.

3. The object estimation device as claimed in claim 2, wherein
    the smoothing means generates a×k pieces of smoothed images $L(x, y, \sigma_i)$, wherein a is an integer of 2 or more, $\sigma_i$ is a scale of the smoothing filter and i=1 to a×k, and
    the differential image generating means generates k pieces of differential images $G(x, y, \sigma_i)$, wherein k is an integer of 2 or more, using the a×k pieces of smoothed images $L(x, y, \sigma_i)$ according to equation (1) below:

$$G(x,y,\sigma_i)=L(x,y,\sigma_i)-L(x,y,\sigma_{i\times a}) \qquad (1).$$

4. The object estimation device as claimed in claim 2, wherein
    the smoothing means generates k pieces of smoothed images $L(x, y, \sigma_i)$, wherein k is an integer of 2 or more, $\sigma_i$ is a scale of the smoothing filter and i=1 to k, and
    the differential image generating means generates k−p pieces of differential images $G(x, y, \sigma_i)$, wherein p is an integer of 1 or more, using the k pieces of smoothed images $L(x, y, \sigma_i)$ according to equation (2) below:

$$G(x,y,\sigma_i)=L(x,y,\sigma_i)-L(x,y,\sigma_{i+p}) \qquad (2).$$

5. The object estimation device as claimed in claim 3, wherein the size estimating means estimates the size of the object based on an extent of widening of blur in the smoothed images $L(x, y, \sigma_i)$ used to generate the differential image $G(x, y, \sigma_i)$ with a largest differential value or a smallest differential value.

6. The object estimation device as claimed in claim 4, wherein the size estimating means estimates the size of the object based on an extent of widening of blur in the smoothed images $L(x, y, \sigma_i)$ used to generate the differential image $G(x, y, \sigma_i)$ with a largest differential value or a smallest differential value.

7. The object estimation device as claimed in claim 1, further comprising preprocessing means for generating, as the image, a resolution-reduced image from an inputted original image.

8. The object estimation device as claimed in claim 1, wherein the image is a moving image, and the object estimation device further comprising preprocessing means, the preprocessing means extracting a motion area containing motion from a frame image based on the moving image, carrying out background differentiation, and applying contrast reduction.

9. The object estimation device as claimed in claim 2, further comprising object detecting means for detecting the object in the image based on the position of the object estimated by the position estimating means or the size of the object estimated by the size estimating means.

10. The object estimation device as claimed in claim 3, further comprising object detecting means for detecting the object in the image based on the position of the object estimated by the position estimating means or the size of the object estimated by the size estimating means.

11. The object estimation device as claimed in claim 4, further comprising object detecting means for detecting the object in the image based on the position of the object estimated by the position estimating means or the size of the object estimated by the size estimating means.

12. An object estimation method comprising the steps of:
    generating a plurality of smoothed images of different scales by repeating convolution of an image with a smoothing filter having filtering characteristics corresponding to a contour of an object;
    generating a plurality of differential images by calculating a difference between each pair of the smoothed images apart from each other by a predetermined scale interval in the generated smoothed images;
    generating a combined image by combining the generated differential images; and
    estimating a position of the object from a position where a maximum or minimum signal value is found in the generated combined image.

13. A non-transitory computer readable medium containing an object estimation program for causing a computer to execute a procedure comprising:
    generating a plurality of smoothed images of different scales by repeating convolution of an image with a smoothing filter having filtering characteristics corresponding to a contour of an object;
    generating a plurality of differential images by calculating a difference between each pair of the smoothed images apart from each other by a predetermined scale interval in the generated smoothed images;
    generating a combined image by combining the generated differential images; and
    estimating a position of the object from a position where a maximum or minimum signal value is found in the generated combined image.

* * * * *